(12) United States Patent
Zhang et al.

(10) Patent No.: US 12,654,154 B2
(45) Date of Patent: Jun. 16, 2026

(54) CHIRAL BIMETALLIC COOPERATIVE CATALYSIS SYSTEM CONTAINING CHELATING LIGAND AND USE THEREOF IN ASYMMETRIC SYNTHESIS OF BEDAQUILINE

(71) Applicant: SHANGHAI JIAO TONG UNIVERSITY, Shanghai (CN)

(72) Inventors: Wanbin Zhang, Shanghai (CN); Feng Gao, Shanghai (CN); Jing Li, Shanghai (CN); Tanveer Ahmad, Shanghai (CN); Yicong Luo, Shanghai (CN); Zhenfeng Zhang, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 167 days.

(21) Appl. No.: 18/694,998

(22) PCT Filed: Mar. 17, 2023

(86) PCT No.: PCT/CN2023/082162
§ 371 (c)(1),
(2) Date: Mar. 25, 2024

(87) PCT Pub. No.: WO2024/007621
PCT Pub. Date: Jan. 11, 2024

(65) Prior Publication Data
US 2025/0083126 A1      Mar. 13, 2025

(30) Foreign Application Priority Data

Jul. 7, 2022    (CN) .......................... 202210795316.9

(51) Int. Cl.
B01J 23/04      (2006.01)
B01J 31/12      (2006.01)
(Continued)

(52) U.S. Cl.
CPC ............ B01J 23/04 (2013.01); B01J 31/122 (2013.01); B01J 31/1805 (2013.01);
(Continued)

(58) Field of Classification Search
CPC .... B01J 2231/34; B01J 23/04; B01J 2531/11; B01J 31/122; B01J 31/1805; B01J 31/2217; B01J 31/2221; B01J 31/2226
See application file for complete search history.

(56) References Cited

U.S. PATENT DOCUMENTS 7,498,343 B2 *   3/2009  Van Gestel ............. A61P 31/06
546/156

FOREIGN PATENT DOCUMENTS

CN       101547904 A   *  9/2009   ............. A61P 31/06
CN       101180302 B      6/2013
(Continued)

OTHER PUBLICATIONS

Lubanyana et al. "Improved Synthesis and Isolation of Bedaquiline" ACS Omega 2020, 5, 3607-3611 (Year: 2020).*

(Continued)

*Primary Examiner* — Latosha Hines
(74) *Attorney, Agent, or Firm* — Bayramoglu Law Offices LLC

(57)      ABSTRACT
A chiral bimetallic cooperative catalysis system containing a chelating ligand and use thereof in asymmetric synthesis of bedaquiline are provided. Specifically, in the chiral bimetallic cooperative catalysis system, an equilibrium constant of a reaction is increased by the chelating ligand formed by an achiral secondary amine and chiral lithium aminoalcohol, thereby promoting an addition reaction between 6-bromo-3-benzyl-2-methoxyquinoline (I) and 3-dimethylamino-1-naphthyl-1-propanone (II) to move forward. By means of
(Continued)

the bimetallic cooperative catalysis system, the yield of the target product (1R,2S)-bedaquiline is obviously increased.

11 Claims, 8 Drawing Sheets

(51) Int. Cl.
    *B01J 31/18*         (2006.01)
    *B01J 31/22*         (2006.01)

(52) U.S. Cl.
    CPC ........ *B01J 31/2217* (2013.01); *B01J 2231/34* (2013.01); *B01J 2531/11* (2013.01)

(56) References Cited

FOREIGN PATENT DOCUMENTS

CN       106866525 A  *  6/2017  ......... C07D 215/227

CN       111747975 A     10/2020
WO     2020161743 A1    8/2020

OTHER PUBLICATIONS

Hlengekile Lubanyana, et al., Improved Synthesis and Isolation of Bedaquiline, ACS Omega, 2020, pp. 3607-3611, vol. 5.

Yutaka Saga, et al., Catalytic Asymmetric Synthesis of R207910, Journal of American Chemical Society, 2010, pp. 7905-7907, vol. 132.

Srivari Chandrasekhar, et al., Practical Syntheses of (2S)-R207910 and (2R)-R207910, European Journal of Organic Chemistry, 2011, pp. 2057-2061.

Sarah Jane Mear, et al., Diastereoselectivity is in the Details: Minor Changes Yield Major Improvements to the Synthesis of Bedaquiline, Chemistry—A European Journal, 2022, pp. 1-8, vol. 28.

* cited by examiner

PeakTable

Detector A Ch1 220nm

| Peak# | Ret. Time | Area | Height | Area % | Height % |
|---|---|---|---|---|---|
| 1 | 9.266 | 1809937 | 105980 | 49.790 | 50.368 |
| 2 | 10.435 | 1825213 | 104432 | 50.210 | 49.632 |
| Total | | 3635150 | 210412 | 100.000 | 100.000 |

PeakTable

Detector A Ch1 220nm

| Peak# | Ret. Time | Area | Height | Area % | Height % |
|---|---|---|---|---|---|
| 1 | 9.532 | 11329064 | 660107 | 95.607 | 95.057 |
| 2 | 10.470 | 520583 | 34325 | 4.393 | 4.943 |
| Total | | 11849646 | 694432 | 100.000 | 100.000 |

AD-H, 0.5 mL/min, Hexane/*i*-PrOH = 98/2, 220 nm, ee of [(*R,S*)/(*S,R*)-diastereomers] = 91%

PeakTable

Detector A Ch1 220nm

| Peak# | Ret. Time | Area | Height | Area % | Height % |
|---|---|---|---|---|---|
| 1 | 9.266 | 1809937 | 105980 | 49.790 | 50.368 |
| 2 | 10.435 | 1825213 | 104432 | 50.210 | 49.632 |
| Total | | 3635150 | 210412 | 100.000 | 100.000 |

PeakTable

Detector A Ch1 220nm

| Peak# | Ret. Time | Area | Height | Area % | Height % |
|---|---|---|---|---|---|
| 1 | 9.291 | 2059198 | 117806 | 99.924 | 99.979 |
| 2 | 9.958 | 1568 | 25 | 0.076 | 0.021 |
| Total | | 2060766 | 117831 | 100.000 | 100.000 |

AD-H, 0.5 mL/min, Hexane/$i$-PrOH = 98/2, 220 nm, ee of [$(R,S)$/$(S,R)$-diastereomers] = 99.8%

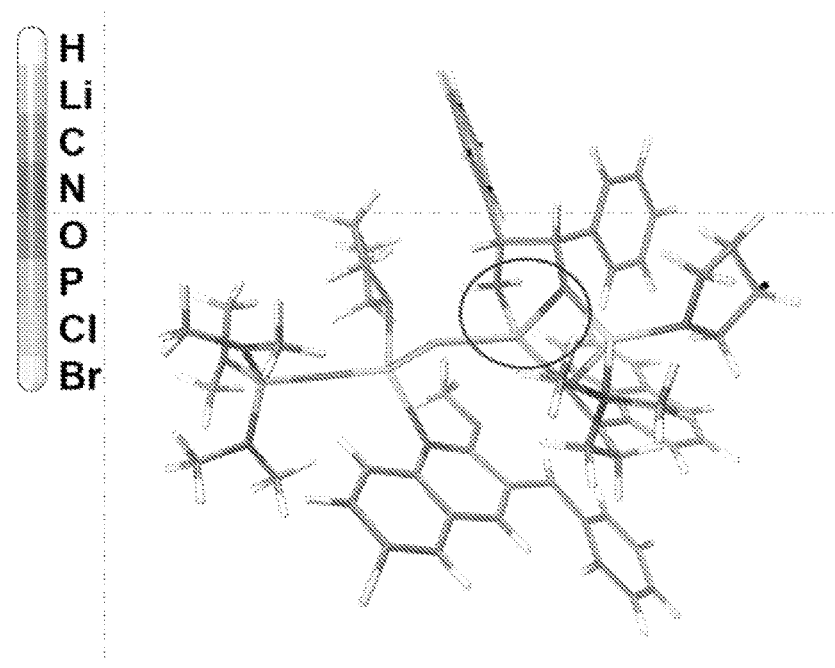

Ion pair  L is a bidentate ligand when n is 0
L is a monodentate ligand when n is 1
L is an achiral ligand

| Ligand | $\Delta G$ (kcal/mol)[a] | Yield (%)[b] |
|---|---|---|
| DBU | -0.17 | 20 |
| HMPA | -0.52 | 22 |
| THF[c] | -1.47 | 50 |
| *N*-methylpiperazine | -3.21 | 57 |

[a] refers to an energy difference between chelating ligands formed by different achiral ligands; [b] refers to a yield obtained under optimized experimental conditions; and [c] refers to an energy difference between chelating ligands formed without addition of a ligand.

CHIRAL BIMETALLIC COOPERATIVE CATALYSIS SYSTEM CONTAINING CHELATING LIGAND AND USE THEREOF IN ASYMMETRIC SYNTHESIS OF BEDAQUILINE

CROSS REFERENCE TO THE RELATED APPLICATIONS

This application is the national phase entry of International Application No. PCT/CN2023/082162, filed on Mar. 17, 2023, which is based upon and claims priority to Chinese Patent Application No. 202210795316.9, filed on Jul. 7, 2022, the entire contents of which are incorporated herein by reference.

TECHNICAL FIELD

The present invention belongs to the technical field of organic synthesis, relates to a chiral bimetallic cooperative catalysis system containing a chelating ligand and use thereof in asymmetric synthesis of bedaquiline, and specifically relates to a chelating ligand formed by an achiral secondary amine and chiral lithium aminoalcohol. The chelating ligand promotes asymmetric synthesis of bedaquiline with a high yield using the chiral bimetallic system.

BACKGROUND

Tuberculosis (TB) is a disease with the highest mortality caused by single pathogenic bacteria in the world. The tuberculosis has a greater mortality than acquired immunodeficiency syndrome (AIDS) in the whole world, which leads to death of millions of persons every year. More seriously, drug-resistant tuberculosis is induced, which is threatening the health of all human beings. In order to improve the situations, scientists have spent a lot of energy in research and development. Bedaquiline, as a diarylquinoline compound, has been used as a first new anti-tuberculosis drug in the past fifty years. In 2012, the bedaquiline was approved by the Food and Drug Administration (FDA) for marketing in the United States, which was the first new drug approved for treatment of multi-drug-resistant tuberculosis. In 2016, the bedaquiline was officially approved by the State Food and Drug Administration of China for marketing in China. The bedaquiline has two consecutive chiral centers and four optical isomers, and only a (1R,2S) configuration is effectively used as a drug. Construction of consecutive chiral centers of trisubstituted and tetrasubstituted carbon in one step is still a great challenge in chemical synthesis. After researched and developed by Johnson & Johnson in 2004, a first industrial synthesis route has been used up to now due to commercial availability of raw materials and simplicity of a synthesis route. However, the method has a low yield and a high cost. At present, a treatment course using the bedaquiline still requires a high treatment cost of greater than 60,000 yuan, which is unaffordable for ordinary families. Improvement of synthesis methods to reduce the production cost and make drugs affordable for low-income persons is a problem to be solved urgently by drug researchers and developers at home and abroad.

According to a synthesis patent of (1R,2S)-bedaquiline (patent authorization No. CN101180302B) in original research, a one-step synthesis method is disclosed. The method includes subjecting 6-bromo-3-benzyl-2-methoxyquinoline (I) to deprotonation at a benzyl site with lithium diisopropylamide (LDA) at a low temperature of −72° C. to −78° C., followed by addition with 3-dimethylamino-1-naphthyl-1-propanone (II) to generate a mixture of 4 optical isomers of bedaquiline; and subjecting reaction materials to concentration, treatment with ethanol and resolution with (R)-(−)-1,1'-binaphthyl-2,2'-diyl hydrogenphosphate as a chiral resolving agent to obtain (1R,2S)-bedaquiline (A) with a low total yield of only 7-9%. In addition, due to high efficiency of asymmetric catalytic synthesis, methods for asymmetric catalytic synthesis of bedaquiline have also attracted extensive attention of scientists. A method for constructing first carbon chirality by asymmetric catalysis and a method for constructing second carbon chirality by asymmetric synthesis have been reported by Shibasaki (*J. Am. Chem. Soc.* 2010, 132, 7905-7907) and Chandrasekhar (*Eur. J. Org. Chem.* 2011, 2057-2061), respectively. The route has the problems of many reaction steps, a low yield, a high manufacturing cost and the like. In addition, according to a research group in South Africa, the diastereoselectivity of bedaquiline (BDQ) was increased to 9:1 by a $C_2$-symmetric chiral amine ligand (*ACS Omega* 2020, 5, 3607-3611) in 2020, and then, an optically pure target compound was obtained by a chiral resolution method. However, the yield of a target product is still not obviously increased. Recently, the yield of bedaquiline in the industrial production route was increased by Jamison et al. using fluid chemistry (*Chem. Eur. J.* 2022, e202201311). However, asymmetric synthesis of a target product is still not achieved. Therefore, it is necessary to develop a more efficient asymmetric synthesis method to increase the yield of the target product (1R,2S)-bedaquiline.

SUMMARY

Aiming at the shortcomings of the prior art, the purpose of the present invention is to provide a chiral bimetallic cooperative catalysis system containing a chelating ligand and use thereof in asymmetric synthesis of bedaquiline. In the system, lithium amide is formed by an achiral secondary amine and n-butyl lithium, and then, the adopted chelating ligand is formed by the lithium amide and chiral lithium aminoalcohol. An equilibrium constant of an addition reaction between 6-bromo-3-benzyl-2-methoxyquinoline (1) and 3-dimethylamino-1-naphthyl-1-propanone (II) is increased, the reaction is promoted to move forward, the yield of a target product is greatly increased, and asymmetric synthesis of bedaquiline with a high yield is achieved. Meanwhile, LDA is added into the system to serve as an alkali, so as to achieve the same effect.

In early research of the present invention, a bimetallic cooperative system containing lithium aminoalcohol and a weak interaction force strategy are used to solve the problem of low selectivity of a target product (with an ee value of 99.5% and a dr value of 16:1). However, the reaction yield is low. According to calculation based on a density functional theory (DFT), it is known in the present invention that during the addition reaction between the 6-bromo-3-benzyl-2-methoxyquinoline (I) and the 3-dimethylamino-1-naphthyl-1-propanone (II), a product precursor is generated in the form of an ion pair in the reaction system, and the target product can be obtained after quenching with a protonic solvent. It is found through research that in a bimetallic cooperative catalysis system of bedaquiline developed in an early stage, lithium amide formed by adding an achiral secondary amine under the action of butyl lithium can form a chelating ligand with chiral lithium aminoalcohol (FIG. 1), where the figure shows a simplified model of the yield simulated based on DFT. Compared with a reaction system without addition of the achiral secondary amine, the reaction system added with a bidentate or monodentate achiral ligand can obtain a more stable intermediate, so that the equilibrium constant of the reaction is increased, the addition reaction between the 6-bromo-3-benzyl-2-methoxyquinoline (I) and the 3-dimethylamino-1-naphthyl-1-propanone (II) is promoted to move forward (FIG. 8), the stereoselectivity of an original product is maintained, and the reaction yield is further increased. Finally, the target product with a high ee value and a high yield is obtained (the ee value is greater than 99% after recrystallization).

The purpose of the present invention is realized through the following technical schemes.

In a first aspect, the present invention provides a bimetallic cooperative catalysis system for synthesis of (1R,2S)-bedaquiline. A bimetal includes n-butyl lithium and another lithium salt, and the bimetallic cooperative catalysis system contains a chelating ligand;

the chelating ligand is formed by lithium amide and chiral lithium aminoalcohol, the lithium amide is generated by an achiral secondary amine and n-butyl lithium, and the chiral lithium aminoalcohol is in-situ generated by amino alcohol and n-butyl lithium;

or the chelating ligand is formed by lithium diisopropylamide, an achiral secondary amine and lithium aminoalcohol, and the chiral lithium aminoalcohol is in-situ generated by amino alcohol and n-butyl lithium.

By adopting the bimetallic cooperative catalysis system containing a chelating ligand for asymmetric synthesis of bedaquiline in the present invention, the yield of the target product (1R,2S)-bedaquiline is greatly increased on the basis of high stereoselectivity. The bimetal is different from two metals in a traditional sense, and based on a reaction mechanism, two parts of lithium salts have a cooperative effect in an activation process to serve as the "bimetal".

As an embodiment, the achiral secondary amine for forming the chelating ligand has a general structural formula of $$R^1 \diagdown N \diagup R^2,$$
$$\underset{H}{|}$$

where $R^1$ and $R^2$ are separately selected from linear $C_{1-3}$ alkyl or $C_{3-8}$ cycloalkyl, the cycloalkyl may be full carbon and may also be substituted with heteroatoms such as N, O and S, and the N atom may be substituted with methyl, ethyl and the like; the $R^1$ and the $R^2$ may be identical or different; and the $R^1$ and the $R^2$ may be a $C_{3-8}$ ring, the cycloalkyl may be full carbon and may also be substituted with heteroatoms such as N, O and S, and the N atom may be substituted with methyl, ethyl and the like.

As an embodiment, the achiral secondary amine is selected from dimethylamine, diethylamine, pyrrolidine, N-methylpiperazine, morpholine, thiamorpholine, piperazine, cyclohexylamine, cyclobutylamine, cycloheptamine and cyclooctylamine (with a structural formula as shown in FIG. 2).

As an embodiment, the amino alcohol is (1S,2R)-2-amino-1,2-diphenylethanol.

As an embodiment, the another lithium salt is selected from one or more of lithium carbonate, lithium chloride, lithium bromide, lithium iodide, lithium fluoride, lithium acetate, lithium hydroxide, lithium sulfate, n-butyl lithium, lithium diisopropylamide, lithium tetramethylpiperidine and lithium hexamethyldisilamine.

In a second aspect, the present invention further relates to use of a chiral bimetallic cooperative catalysis system containing an achiral chelating ligand in synthesis of (1R,2S)-bedaquiline. In the bimetallic cooperative catalysis system containing an achiral chelating ligand, an organic solution of 6-bromo-3-benzyl-2-methoxyquinoline (I) is added dropwise to carry out a reaction at a temperature of −78° C. to 0° C., then an organic solution of 3-N,N-dimethylamino-1-naphthyl-1-propanone (II) is continuously added to carry out another reaction, and a resulting product is subjected to separation and purification to obtain (1R,2S)-bedaquiline.

As an embodiment, an organic solvent used in the organic solution includes one or more of tetrahydrofuran, ethyl ether, methyl tert-butyl ether, 1,4-dioxane, diisopropyl ether and ethylene glycol dimethyl ether.

As an embodiment, the organic solution of 6-bromo-3-benzyl-2-methoxyquinoline (1) is added dropwise to carry out a reaction for 10 min-12 h. The time may be 10-30 min, 30-50 min, 50-60 min, 1-1.5 h, 1.5-2 h, 2-2.5 h, 2.5-3 h, 3-3.5 h, 3.5-4 h, 4-4.5 h, 4.5-5 h, 5-5.5 h, 5.5-6 h, 6-7 h, 7-8 h, 8-9 h, 9-10 h, 10-11 h, 11-12 h and the like.

As an embodiment, the organic solution of 3-N,N-dimethylamino-1-naphthyl-1-propanone (II) is added to carry out another reaction for 10 min-12 h. The time may be 10-30 min, 30-50 min, 50-60 min, 1-1.5 h, 1.5-2 h, 2-2.5 h, 2.5-3 h, 3-3.5 h, 3.5-4 h, 4-4.5 h, 4.5-5 h, 5-5.5 h, 5.5-6 h, 6-7 h, 7-8 h, 8-9 h, 9-10 h, 10-11 h, 11-12 h and the like.

As an embodiment, a method includes the following steps:

S1-1, enabling another lithium salt, amino alcohol, an achiral secondary amine and n-butyl lithium to carry out a reaction in the presence of a solvent at −80° C. to 0° C. for 10 min-2 h, where in some embodiments, the reaction is carried out at −30° C. to 0° C. for 30 min;

or S1-2, enabling another lithium salt, amino alcohol, an achiral secondary amine and n-butyl lithium to carry out a reaction in the presence of a solvent at −80° C. to 0° C. for 10 min-2 h, and then adding lithium diisopropylamide to carry out another reaction continuously at −80° C. to 0° C. for 10 min-2 h, where in some embodiments, the reaction is carried out at −30° C. to 0° C. for 10 min, and then the lithium diisopropylamide is added to carry out the another reaction at −30° C. to 0° C. for 30 min; and S2, adding 6-bromo-3-benzyl-2-methoxyquinoline (I) dropwise into the system in step S1-1 or S1-2, performing stirring to carry out a reaction for 10 min-12 h after the addition is completed, lowering the temperature to −59° C. to −78° C., and then adding 3-N,N-dimethylamino-1-naphthyl-1-propanone (II) to carry out another reaction for 10 min-12 h.

As an embodiment, the reaction for forming a chelating ligand in step S1-1 or S1-2 is carried out for 1 min-2 h. The time may be 1-10 min, 10-20 min, 20-30 min, 30-40 min, 40-50 min, 50-60 min, 1-1.5 h, 1.5-2 h and the like.

As an embodiment, in step S-1, the n-butyl lithium is added in the form of an n-hexane solution of n-butyl lithium, and the solvent includes tetrahydrofuran.

As an embodiment, in step S-2, the n-butyl lithium is added in the form of an n-hexane solution of n-butyl lithium, the lithium diisopropylamide is added in the form of a tetrahydrofuran/n-heptane/ethylbenzene solution of lithium diisopropylamide, and the solvent includes tetrahydrofuran.

As an embodiment, in step S1-1, the use amount of the another lithium salt, the amino alcohol, the achiral secondary amine and the n-butyl lithium is 0.1-5 times, 1-5 times, 0.1-5 times and 1-5 times of the equivalent of the 6-bromo-3-benzyl-2-methoxyquinoline (I), respectively. In some embodiments, the use amount of the another lithium salt, the amino alcohol, the achiral secondary amine and the n-butyl lithium is 2-2.4 times, 1.5 times, 2.1 times and 3.7 times of the equivalent of the 6-bromo-3-benzyl-2-methoxyquinoline (I), respectively.

As an embodiment, in step S1-2, the use amount of the another lithium salt, the amino alcohol, the achiral secondary amine, the n-butyl lithium and the lithium diisopropylamide is 0.1-5 times, 1-5 times, 0.1-5 times, 1-5 times and 1-5 times of the equivalent of the 6-bromo-3-benzyl-2-methoxyquinoline (I), respectively. In some embodiments, the use amount of the another lithium salt, the amino alcohol, the achiral secondary amine, the n-butyl lithium and the lithium diisopropylamide is 2.4 times, 1.8 times, 1.8 times and 1.8 times of the equivalent of the 6-bromo-3-benzyl-2-methoxyquinoline (I), respectively.

As an embodiment, in step S2, the equivalent ratio of the 6-bromo-3-benzyl-2-methoxyquinoline to the 3-N,N-dimethylamino-1-naphthyl-1-propanone is 1:(1-10). In some embodiments, the equivalent ratio is 1:1.2.

As an embodiment, in step S1-1 or S1-2, the solvent is selected from one or more of ethyl ether, tetrahydrofuran, methyl tert-butyl ether, 1,4-dioxane, diisopropyl ether and ethylene glycol dimethyl ether.

The present invention has the following beneficial effects.

In currently reported work, the highest yield of a (1R,2S)-bedaquiline monomer is 30%, while in the present invention, the yield of the (1R,2S)-bedaquiline can be as high as 62%, and the enantioselectivity is greater than 99% after recrystallization.

BRIEF DESCRIPTION OF THE DRAWINGS

Other features, purposes and advantages of the present invention will become more apparent by reading the detailed description of non-restrictive embodiments with reference to attached drawings below.

FIG. 8 shows a simplified model of the yield simulated based on DFT; and

FIG. 9 shows a structural model of a chelating ligand simulated based on DFT.

DETAILED DESCRIPTION OF THE EMBODIMENTS

The present invention is described in detail in combination with specific embodiments below. The following embodiments will facilitate the present invention to be further understood by persons skilled in the art, and are not intended to limit the present invention in any manner. It is to be noted that for persons of ordinary skill in the art, various modifications or improvements can be made without departing from the concept of the present invention. All the modifications or improvements fall within the scope of protection of the present invention.

Figure 1:
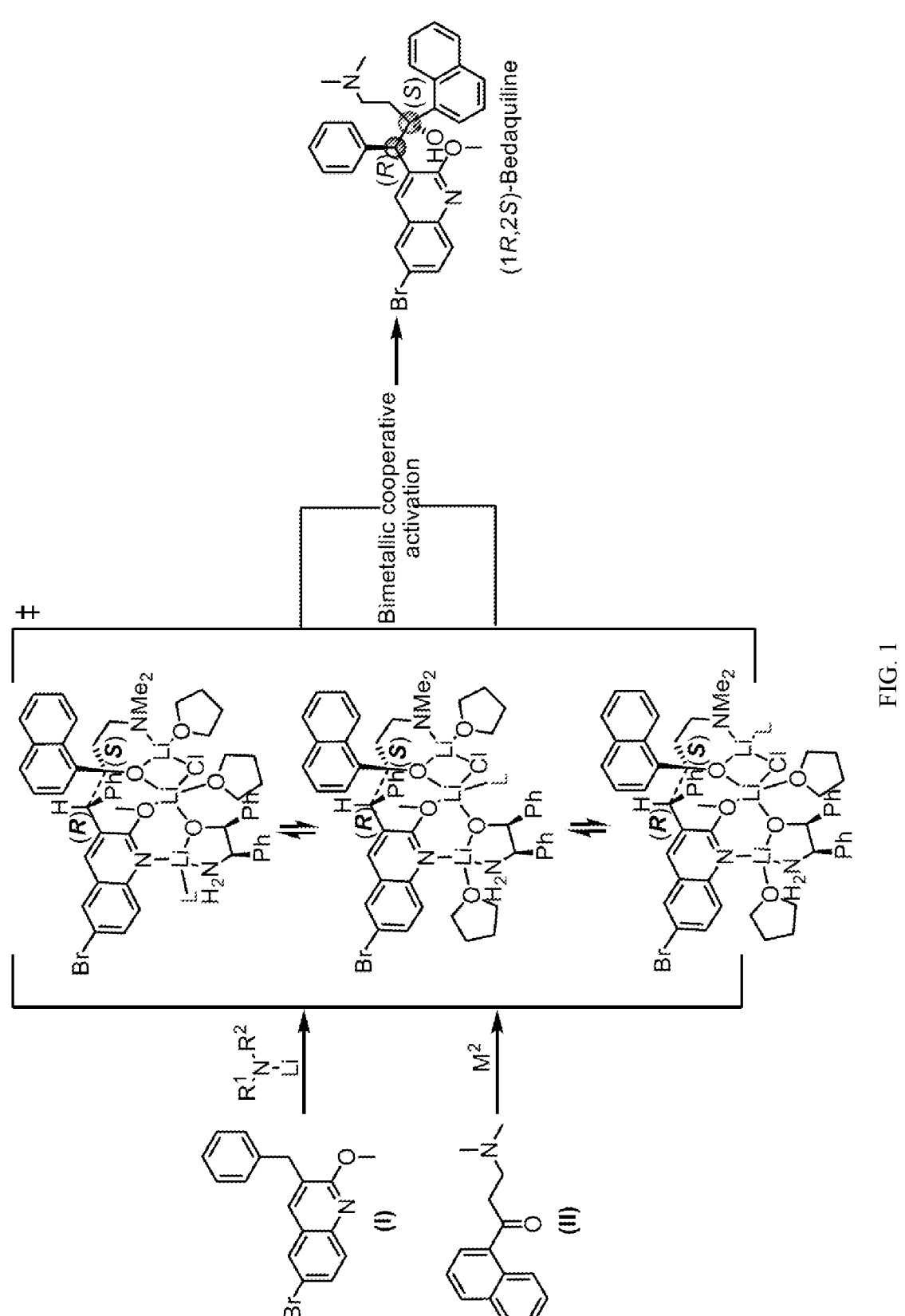
FIG. 1 is a schematic synthesis diagram showing asymmetric synthesis of bedaquiline in the present invention; in the figure, $R^1$ and $R^2$ are any substituent of any secondary amine and may be separately selected from linear $C_{1-3}$ alkyl or $C_{3-8}$ cycloalkyl, the cycloalkyl may be full carbon and may also be substituted with heteroatoms such as N, O and S, and the N atom may be substituted with methyl, ethyl and the like; the $R^1$ and the $R^2$ may be identical or different; the $R^1$ and the $R^2$ may be a $C_{3-8}$ ring, the cycloalkyl may be full carbon and may also be substituted with heteroatoms such as N, O and S, and the N atom may be substituted with methyl, ethyl and the like; and L is an achiral secondary amine ligand.
Figure 2:
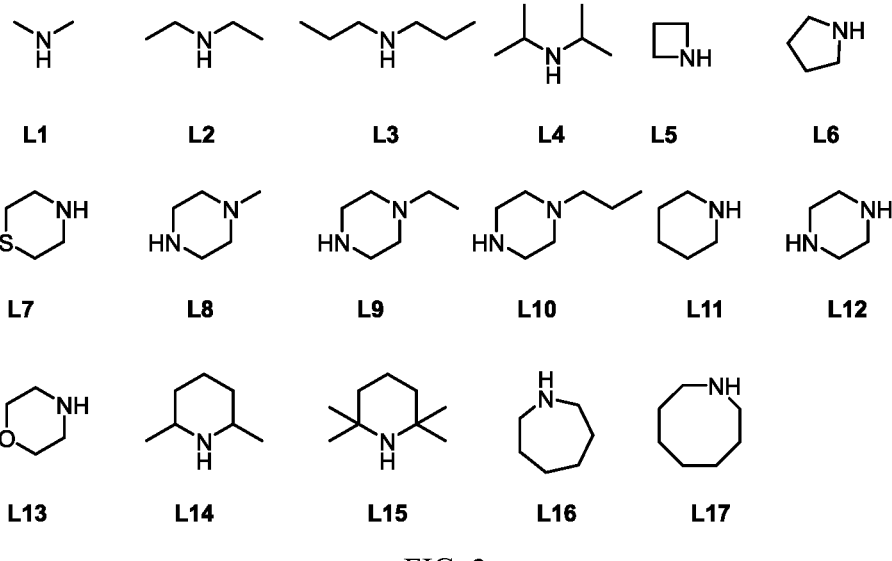
FIG. 2 shows structural formals of preferred achiral secondary amine ligands.

A schematic synthesis diagram of a method for asymmetric synthesis of (1R,2S)-bedaquiline with a high yield in the present invention is shown in FIG. 1.

In the following embodiments, the reaction temperature is preferably a low temperature of −78° C. to 0° C., and the total reaction time may be set as 12 min-26 h. Step 1: The time for obtaining a chiral bimetallic catalysis system containing a chelating ligand is 1-120 min. Step 2: 6-bromo-3-benzyl-2-methoxyquinoline (I) as a raw material is added to carry out a reaction for 10 min-12 h. Step 3: An organic solution of 3-N,N-dimethylamino-1-naphthyl-1-propanone (II) is added to carry out another reaction for 10 min-12 h.

In the following embodiments, the enantiomeric excess percentage (namely, an ee value) is determined by high performance liquid chromatography (HPLC, with a chiral column). LC-2010 purchased from Shimadzu is used as an instrument for HPLC analysis, and specific operating conditions include: using a Chiralpak AD-H chiral chromatographic column produced by Daicel of Japan.

Example 1

Figure 3:
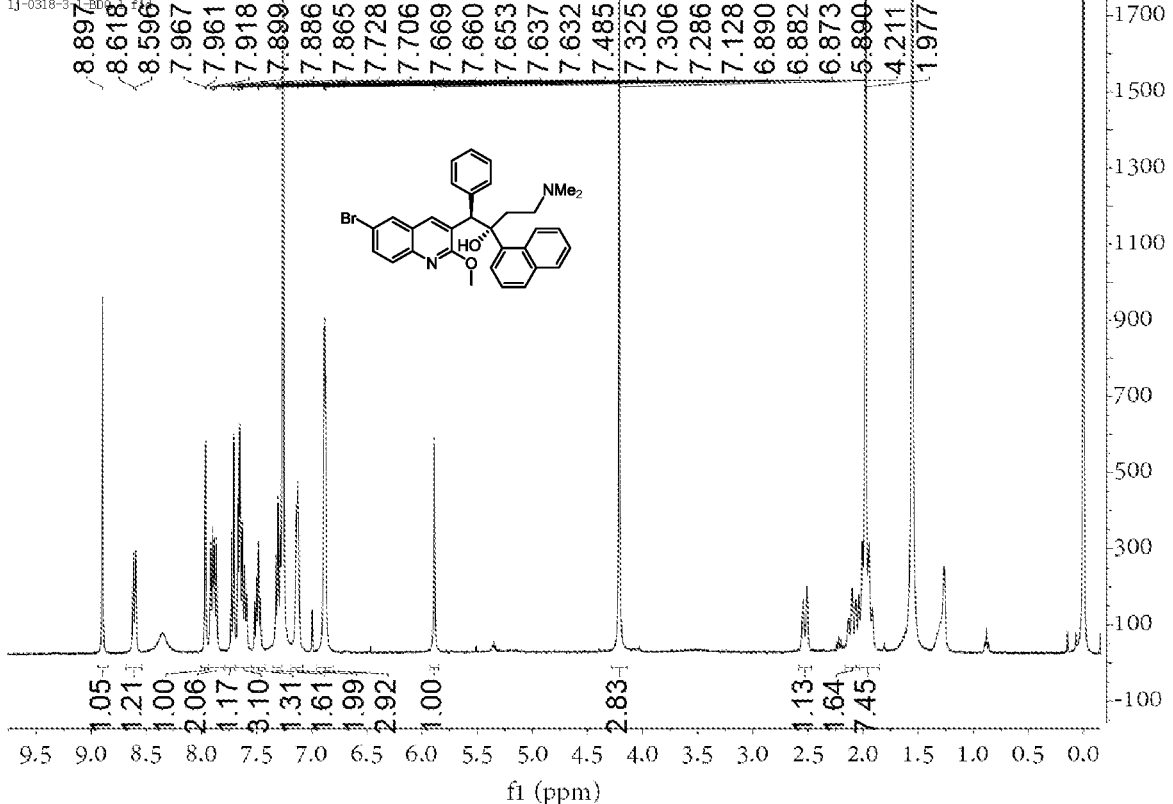
FIG. 3 shows hydrogen nuclear magnetic resonance spectra of a product (1R,2S)-bedaquiline.

Under the protection of nitrogen, 67.8 mg (1.6 mmol, 2.0 equiv) of lithium chloride, 246.4 mg (1.2 mmol, 1.5 equiv) of (1S,2R)-2-amino-1,2-diphenylethanol, 141.0 μL (1.7 mmol, 2.1 equiv) of pyrrolidine, and 6 mL of anhydrous tetrahydrofuran were added into a 50 mL dry Schlenk tube. A reaction flask was placed in a cold trap (0° C.), 1.8 mL (2.9 mmol) of an n-hexane solution of 1.6 M n-butyl lithium was slowly added, and a stable chelating ligand was formed by the pyrrolidine and lithium aminoalcohol (FIG. 9). After a reaction was carried out for 30 min, 8 mL of a tetrahydrofuran (THF) solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −60° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −60° C. in the addition process. After the addition was completed, a reaction was continuously carried out for 2 h. According to calculation based on DFT (as shown in FIG. 8), in a subsequent process, a stable intermediate was formed by the previously generated chelating ligand and raw materials in the reaction system, so as to promote a reaction to move forward. After the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 59% (FIG. 3, $^1$H NMR (400 MHz, CDCl$_3$): δ 8.89 (s, 1H), 8.60 (d, J=8.8 Hz, 11H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.4:1. According to determination by HPLC, the product had an ee value of 83%. After the product was recrystallized with a mixed solvent of isopropyl alcohol and isopropyl ether, a target product with an ee value of greater than 99% was obtained.

Example 2

Under the protection of nitrogen, 166.7 mg (1.9 mmol, 2.4 equiv) of lithium bromide, 246.4 mg (1.2 mmol, 1.5 equiv) of (1S,2R)-2-amino-1,2-diphenylethanol, 141.0 μL (1.7 mmol, 2.1 equiv) of pyrrolidine, and 6 mL of anhydrous tetrahydrofuran were added into a 50 mL dry Schlenk tube. A reaction flask was placed in a cold trap (0° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −78° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −78° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 61% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.4:1. According to determination by HPLC, the product had an ee value of 83%. After adopting a recrystallization method same as that in Example 1, a target product with an ee value of greater than 99% was obtained.

Example 3

Under the protection of nitrogen, 254.3 mg (1.9 mmol, 2.4 equiv) of lithium iodide, 246.4 mg (1.2 mmol, 1.5 equiv) of (1S,2R)-2-amino-1,2-diphenylethanol, 141.0 μL (1.7 mmol, 2.1 equiv) of pyrrolidine, and 6 mL of anhydrous tetrahydrofuran were added into a 50 mL dry Schlenk tube. A reaction flask was placed in a cold trap (−20° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −60° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −60° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 64% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.3:1. According to determination by HPLC, the product had an ee value of 88%. After adopting a recrystallization method same as that in Example 1, a target product with an ee value of greater than 99% was obtained.

Example 4

Figure 4:
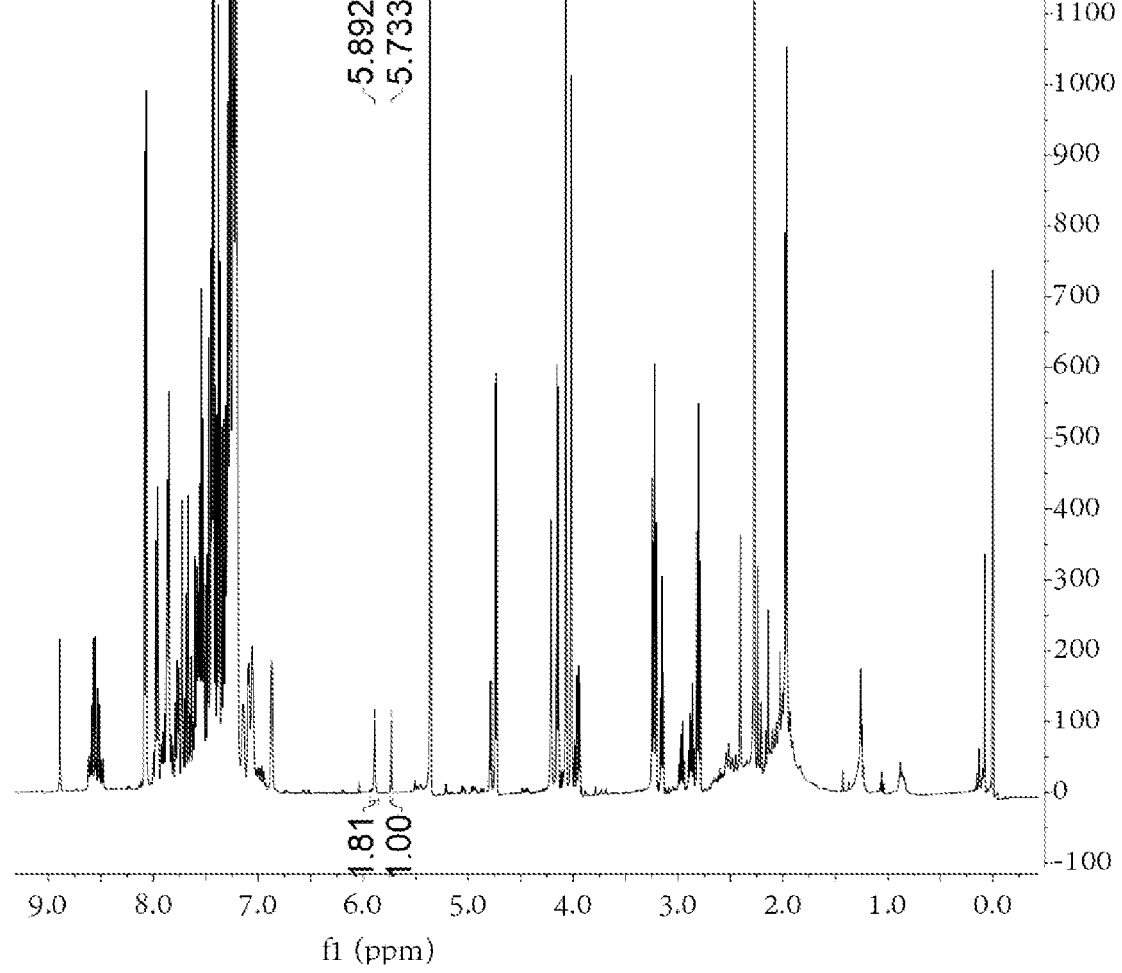
FIG. 4 shows hydrogen nuclear magnetic resonance spectra of a product with a dr value of 1.8:1.
Figure 7:
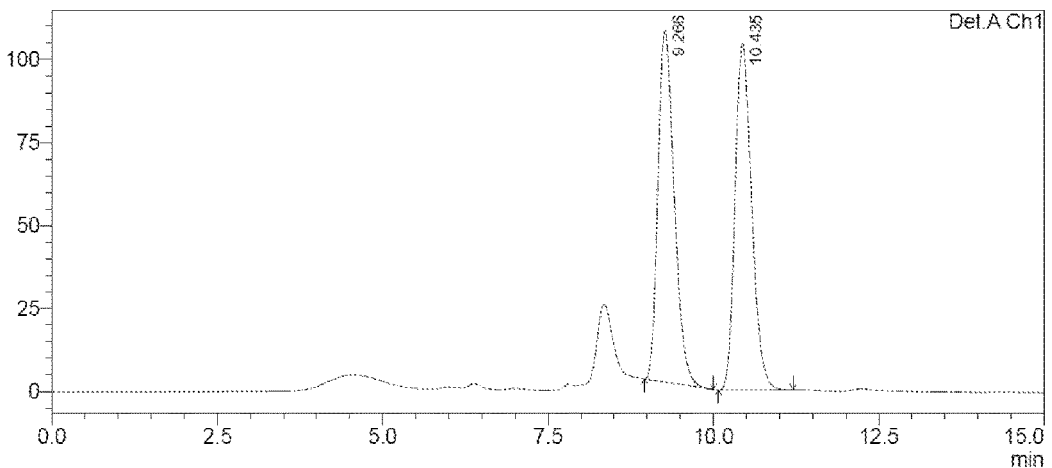
FIG. 7 shows liquid chromatography spectra of a product with an ee value of 99%.
Figure 7:
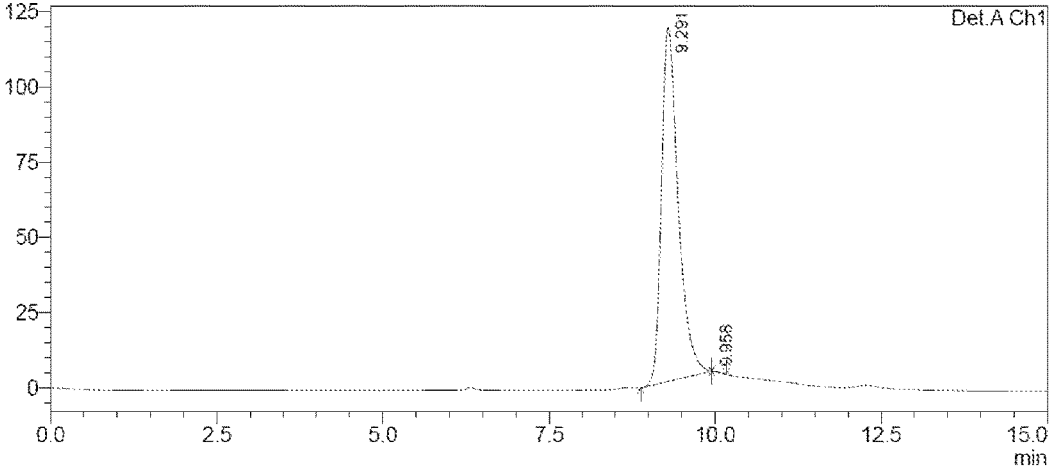

Under the protection of nitrogen, 67.8 mg (1.6 mmol, 2.0 equiv) of lithium chloride, 246.4 mg (1.2 mmol, 1.5 equiv) of (1S,2R)-2-amino-1,2-diphenylethanol, 147.8 μL (1.7 mmol, 2.1 equiv) of morpholine, and 6 mL of anhydrous tetrahydrofuran were added into a 50 mL dry Schlenk tube. A reaction flask was placed in a cold trap (0° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −60° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −60° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 90% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.8:1 (FIG. 4). According to determination by HPLC, the product had an ee value of 90%. After adopting a recrystallization method same as that in Example 1, a target product with an ee value of greater than 99% was obtained (FIG. 7).

Example 5

Figure 5:
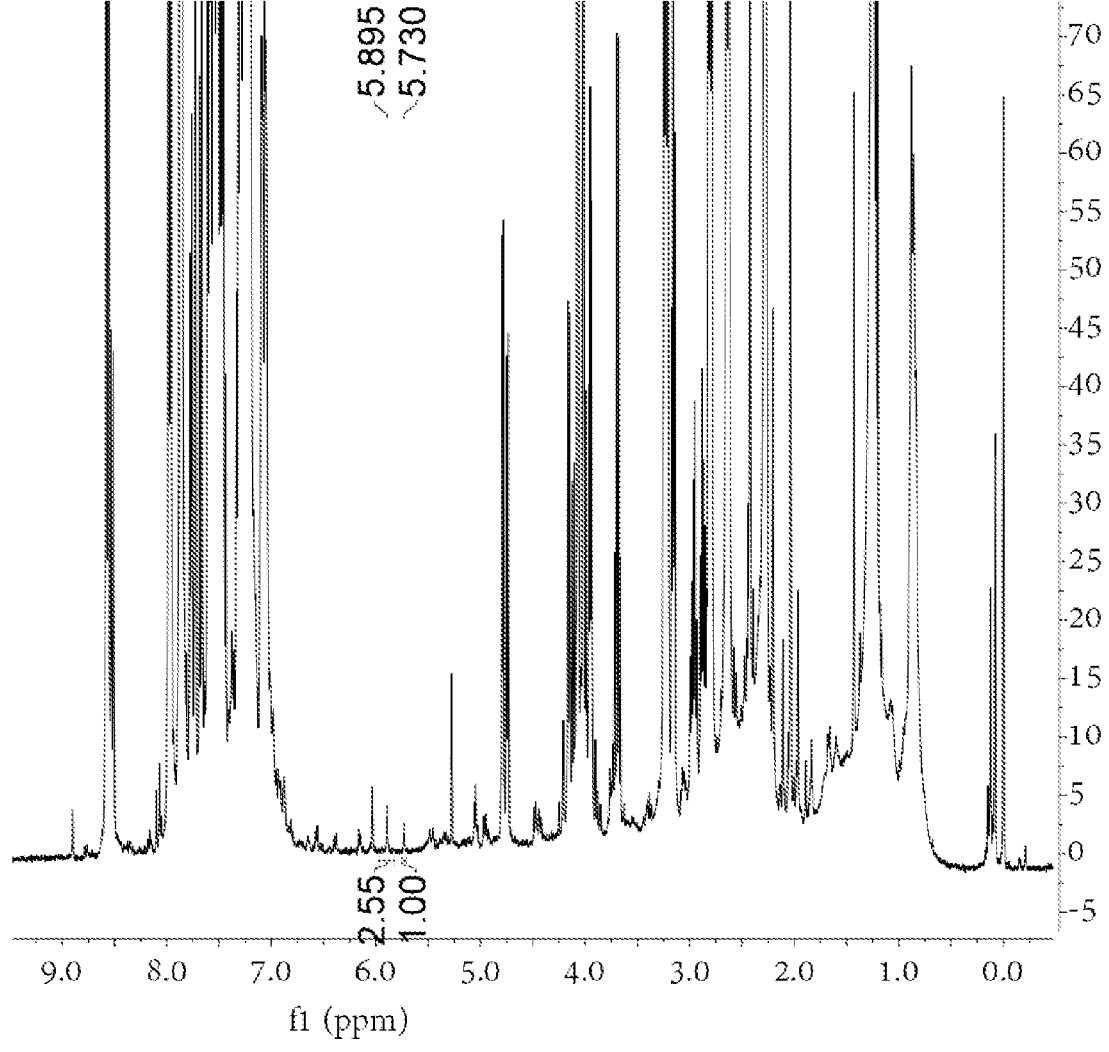
FIG. 5 shows hydrogen nuclear magnetic resonance spectra of a product with a dr value of 2.5:1.
Figure 6:
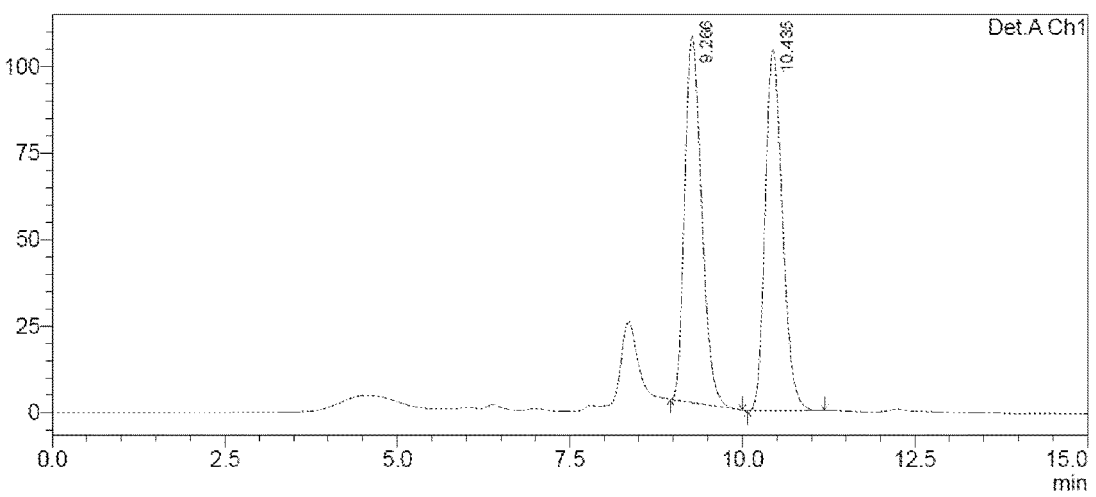
FIG. 6 shows liquid chromatography spectra of a product with an ee value of 91%.
Figure 6:
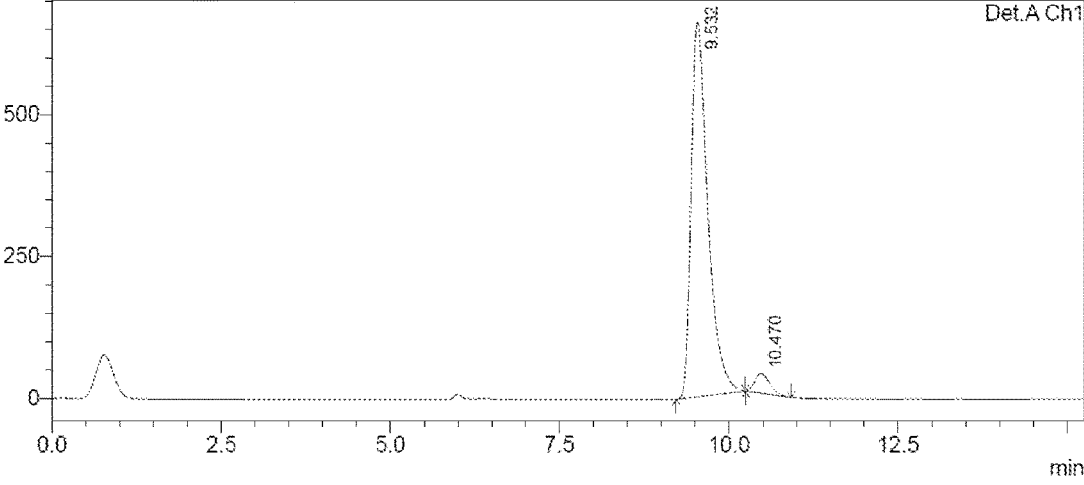

Under the protection of nitrogen, 166.7 mg (1.9 mmol, 2.4 equiv) of lithium bromide, 246.4 mg (1.2 mmol, 1.5 equiv) of (1S,2R)-2-amino-1,2-diphenylethanol, 147.8 μL (1.7 mmol, 2.1 equiv) of morpholine, and 6 mL of anhydrous tetrahydrofuran were added into a 50 mL dry Schlenk tube. A reaction flask was placed in a cold trap (−20° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −60° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −59° C. to −62° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 90% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 2.5:1 (FIG. 5). According to determination by HPLC, the product had an ee value of 91% (FIG. 6). After adopting a recrystallization method same as that in Example 1, a target product with an ee value of greater than 99% was obtained (FIG. 4).

Example 6

Under the protection of nitrogen, 254.3 mg (1.9 mmol, 2.4 equiv) of lithium iodide, 246.4 mg (1.2 mmol, 1.5 equiv) of (1S,2R)-2-amino-1,2-diphenylethanol, 147.8 μL (1.7 mmol, 2.1 equiv) of morpholine, and 6 mL of anhydrous tetrahydrofuran were added into a 50 mL dry Schlenk tube. A reaction flask was placed in a cold trap (−20° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −78° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −78° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 59% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.6:1. According to determination by HPLC, the product had an ee value of 87%. After adopting a recrystallization method same as that in Example 1, a target product with an ee value of greater than 99% was obtained.

Example 7

Under the protection of nitrogen, 67.8 mg (1.6 mmol, 2.0 equiv) of lithium chloride, 246.4 mg (1.2 mmol, 1.5 equiv) of (1S,2R)-2-amino-1,2-diphenylethanol, 188.6 μL (1.7 mmol, 2.1 equiv) of N-methylpiperazine, and 6 mL of anhydrous tetrahydrofuran were added into a 50 mL dry Schlenk tube. A reaction flask was placed in a cold trap (−10° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −60° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −60° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 73% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.4:1. According to determination by HPLC, the product had an ee value of 91%. After adopting a recrystallization method same as that in Example 1, a target product with an ee value of greater than 99% was obtained.

Example 8

Under the protection of nitrogen, 166.7 mg (1.9 mmol, 2.4 equiv) of lithium bromide, 246.4 mg (1.2 mmol, 1.5 equiv) of (1S,2R)-2-amino-1,2-diphenylethanol, 188.6 μL (1.7 mmol, 2.1 equiv) of N-methylpiperazine, and 6 mL of anhydrous tetrahydrofuran were added into a 50 mL dry Schlenk tube. A reaction flask was placed in a cold trap (−10° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxy-quinoline was slowly and completely added dropwise within 1 h. After the addition was completed, a mixed solution was continuously stirred for 1 h. Then, the temperature of the cold trap was lowered to −78° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −78° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 68% ($^1$H NMR (400 MHz, CDCl$_3$): δ 8.89 (s, 11H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.3:1. According to determination by HPLC, the product had an ee value of 86%. After adopting a recrystallization method same as that in Example 1, a target product with an ee value of greater than 99% was obtained.

Example 9

Under the protection of nitrogen, 254.3 mg (1.9 mmol, 2.4 equiv) of lithium iodide, 246.4 mg (1.2 mmol, 1.5 equiv) of (1S,2R)-2-amino-1,2-diphenylethanol, 188.6 μL (1.7 mmol, 2.1 equiv) of N-methylpiperazine, and 6 mL of anhydrous tetrahydrofuran were added into a 50 mL dry Schlenk tube. A reaction flask was placed in a cold trap (−10° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −60° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −59° C. to −62° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 69% (FIG. 3, $^1$H NMR (400 MHz, CDCl$_3$): δ 8.89 (s, 1H), 8.60 (d, J=8.8 Hz, 111), 7.96 (d, J=2.0 Hz, 1H), 7.90 (d, J=7.2 Hz, 1H), 7.87 (d, J=8.4 Hz, 11H), 7.71 (d, J=8.8 Hz, 1H), 7.66-7.59 (m, 3H), 7.51-7.46 (m, 11H), 7.30 (t, J=8.0 Hz, 1H), 7.16-7.12 (m, 2H), 6.88-6.87 (m, 3H), 5.89 (s, 1H), 4.21 (s, 311), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.4:1. According to determination by HPLC, the product had an ee value of 86%. After adopting a recrystallization method same as that in Example 1, a target product with an ee value of greater than 99% was obtained.

Example 10

Under the protection of nitrogen, 67.8 mg (1.6 mmol, 2.0 equiv) of lithium chloride, 246.4 mg (1.2 mmol, 1.5 equiv) of (1S,2R)-2-amino-1,2-diphenylethanol, 86.1 μL (1.7 mmol, 2.1 equiv) of dimethylamine, and 6 mL of anhydrous tetrahydrofuran were added into a 50 mL dry Schlenk tube. A reaction flask was placed in a cold trap (−10° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −60° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −59° C. to −62° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 57% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.4:1. According to determination by HPLC, the product had an ee value of 81%. After adopting a recrystallization method same as that in Example 1, a target product with an ee value of greater than 99% was obtained.

Example 11

Under the protection of nitrogen, 166.7 mg (1.9 mmol, 2.4 equiv) of lithium bromide, 246.4 mg (1.2 mmol, 1.5 equiv) of (1S,2R)-2-amino-1,2-diphenylethanol, 86.1 μL (1.7 mmol, 2.1 equiv) of dimethylamine, and 6 mL of anhydrous tetrahydrofuran were added into a 50 mL dry Schlenk tube. A reaction flask was placed in a cold trap (0° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −70° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −70° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 56% ($^1$H NMR (400 MHz, CDCl$_3$): δ 8.89 (s, 1H), 8.60 (d, J=8.8 Hz, 11H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.4:1. According to determination by HPLC, the product had an ee value of 80%. After adopting a recrystallization method same as that in Example 1, a target product with an ee value of greater than 99% was obtained.

Example 12

Under the protection of nitrogen, 254.3 mg (1.9 mmol, 2.4 equiv) of lithium iodide, 246.4 mg (1.2 mmol, 1.5 equiv) of (1S,2R)-2-amino-1,2-diphenylethanol, 86.1 µL (1.7 mmol, 2.1 equiv) of dimethylamine, and 6 mL of anhydrous tetrahydrofuran were added into a 50 mL dry Schlenk tube. A reaction flask was placed in a cold trap (0° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −50° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −50° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 59% (1H NMR (400 MHz, CDCl$_3$): δ 8.89 (s, 1H), 8.60 (d, J=8.8 Hz, 11H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.4:1. According to determination by HPLC, the product had an ee value of 83%. After adopting a recrystallization method same as that in Example 1, a target product with an ee value of greater than 99% was obtained.

Example 13

Under the protection of nitrogen, 67.8 mg (1.6 mmol, 2.0 equiv) of lithium chloride, 246.4 mg (1.2 mmol, 1.5 equiv)

of (1S,2R)-2-amino-1,2-diphenylethanol, 175.9 µL (1.7 mmol, 2.1 equiv) of diethylamine, and 6 mL of anhydrous tetrahydrofuran were added into a 50 mL dry Schlenk tube. A reaction flask was placed in a cold trap (−30° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −60° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −59° C. to −62° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 55% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.4:1. According to determination by HPLC, the product had an ee value of 82%. After adopting a recrystallization method same as that in Example 1, a target product with an ee value of greater than 99% was obtained.

Example 14

Under the protection of nitrogen, 166.7 mg (1.9 mmol, 2.4 equiv) of lithium bromide, 246.4 mg (1.2 mmol, 1.5 equiv) of (1S,2R)-2-amino-1,2-diphenylethanol, 175.9 µL (1.7 mmol, 2.1 equiv) of diethylamine, and 6 mL of anhydrous tetrahydrofuran were added into a 50 mL dry Schlenk tube. A reaction flask was placed in a cold trap (−10° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −78° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −78° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 54% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.4:1. According to determination by HPLC, the product had an ee value of 80%. After adopting a recrystallization method same as that in Example 1, a target product with an ee value of greater than 99% was obtained.

Example 15

Under the protection of nitrogen, 254.3 mg (1.9 mmol, 2.4 equiv) of lithium iodide, 246.4 mg (1.2 mmol, 1.5 equiv) of (1S,2R)-2-amino-1,2-diphenylethanol, 175.9 µL (1.7 mmol, 2.1 equiv) of diethylamine, and 6 mL of anhydrous tetrahydrofuran were added into a 50 mL dry Schlenk tube. A reaction flask was placed in a cold trap (0° C.), and 1.8 mL (2.9 mmol) of an n-hexane solution of 1.6 M n-butyl lithium was slowly added. After a reaction was carried out for 30 min, 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 1 h. Then, the temperature of the cold trap was lowered to −78° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −78° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 58% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.4:1. According to determination by HPLC, the product had an ee value of 81%. After adopting a recrystallization method same as that in Example 1, a target product with an ee value of greater than 99% was obtained.

Example 16

Under the protection of nitrogen, 81.4 mg (1.9 mmol, 2.4 equiv) of lithium chloride, 298.6 mg (1.4 mmol, 1.76 equiv) of (1S,2R)-2-amino-1,2-diphenylethanol, 188.6 µL (1.7 mmol, 2.1 equiv) of N-methylpiperazine, and 6 mL of anhydrous tetrahydrofuran were added into a 50 mL dry Schlenk tube. A reaction flask was placed in a cold trap (−20° C.), and 0.88 mL (1.4 mmol) of an n-hexane solution of 1.6 M n-butyl lithium was slowly added. After a reaction was carried out for 10 min, 0.77 mL (1.4 mmol) of a tetrahydrofuran/n-heptane/ethylbenzene solution of 2.0 M LDA was added dropwise to carry out a reaction at a temperature of −20° C. for half an hour, and then 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 2 h. Then, the temperature of the cold trap was lowered to −60° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −60° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 58% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 2:1. According to determination by HPLC, the product had an ee value of 94%.

Example 17

Under the protection of nitrogen, 81.4 mg (1.9 mmol, 2.4 equiv) of lithium chloride, 298.6 mg (1.4 mmol, 1.76 equiv) of (1S,2R)-2-amino-1,2-diphenylethanol (L1), 141.0 µL (1.7 mmol, 2.1 equiv) of pyrrolidine, and 6 mL of anhydrous tetrahydrofuran were added into a 50 mL dry Schlenk tube. A reaction flask was placed in a cold trap (−30° C.), and 0.88 mL (1.4 mmol) of an n-hexane solution of 1.6 M n-butyl lithium was slowly added. After a reaction was carried out for 10 min, 0.77 mL (1.4 mmol) of a tetrahydrofuran/n-heptane/ethylbenzene solution of 2.0 M LDA was added dropwise to carry out a reaction at a temperature of −30° C. for half an hour, and then 8 mL of a THF solution of 262.6 mg (0.8 mmol, 1.0 equiv) of 3-benzyl-6-bromo-2-methoxy-quinoline was slowly and completely added dropwise within 1 h. After the addition was completed, a mixed solution was continuously stirred for 2 h. Then, the temperature of the cold trap was lowered to −78° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −78° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 61% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 1.9:1. According to determination by HPLC, the product had an ee value of 92%.

Example 18

Under the protection of nitrogen, 81.4 mg (1.9 mmol, 2.4 equiv) of lithium chloride, 298.6 mg (1.4 mmol, 1.76 equiv) of (1S,2R)-2-amino-1,2-diphenylethanol, 147.8 μL (1.7 mmol, 2.1 equiv) of morpholine, and 6 mL of anhydrous tetrahydrofuran were added into a 50 mL dry Schlenk tube. A reaction flask was placed in a cold trap (−10° C.), and 0.88 mL (1.4 mmol) of an n-hexane solution of 1.6 M n-butyl lithium was slowly added. After a reaction was carried out for 10 min, 0.77 mL (1.4 mmol) of a tetrahydrofuran/n-heptane/ethylbenzene solution of 2.0 M LDA was added dropwise to carry out a reaction at a temperature of −10° C. for half an hour, and then 8 mL of a THF solution of 262.6 mg (0.8 mmol, 1.0 equiv) of 3-benzyl-6-bromo-2-methoxyquinoline was slowly and completely added dropwise within 1 h. After the addition was completed, a mixed solution was continuously stirred for 2 h. Then, the temperature of the cold trap was lowered to −78° C., and a solution formed by 212.8 mg (0.96 mmol, 1.2 equiv) of 3-N,N-dimethylamino-1-naphthyl-1-propanone and 6 mL of THF was slowly added within next 60 min, where the temperature of the reaction system was maintained at −78° C. in the addition process. After the addition was completed, a reaction was continuously carried out for 2 h. Same as the reaction process in Example 1, after the reaction was completed, the reaction was quenched with a saturated ammonium chloride solution at low temperature, and a reaction solution was transferred to a place at room temperature and extracted with ethyl acetate (3×5 mL), followed by column chromatography to obtain a pure product with a yield of 55% ($^1$H NMR (400 MHz, CDCl$_3$): δ 8.89 (s, 1H), 8.60 (d, J=8.8 Hz, 1H), 7.96 (d, J=2.0 Hz, 1H), 7.90 (d, J=7.2 Hz, 1H), 7.87 (d, J=8.4 Hz, 1H), 7.71 (d, J=8.8 Hz, 1H), 7.66-7.59 (m, 3H), 7.51-7.46 (m, 1H), 7.30 (t, J=8.0 Hz, 1H), 7.16-7.12 (m, 2H), 6.88-6.87 (m, 3H), 5.89 (s, 1H), 4.21 (s, 3H), 2.54-2.50 (m, 1H), 2.13-2.00 (m, 2H), 1.97 (s, 6H), 1.95-1.90 (m, 1H).). According to determination of a crude product by nuclear magnetic resonance, the product had a dr value of 2:1. According to determination by HPLC, the product had an ee value of 91%.

Only some embodiments of the present invention are described above. It is to be understood that the present invention is not limited to the above specific embodiments, and any equivalent changes and modifications made in accordance with the scope of the patent application of the present invention fall within the scope of the present invention.

What is claimed is:

1. A bimetallic cooperative catalysis system for synthesis of (1R,2S)-bedaquiline, wherein a bimetal comprises n-butyl lithium and another lithium salt, and the bimetallic cooperative catalysis system comprises a chelating ligand;

the chelating ligand is formed by lithium amide and chiral lithium aminoalcohol, the lithium amide is generated by an achiral secondary amine and the n-butyl lithium, and the chiral lithium aminoalcohol is in-situ generated by amino alcohol and the n-butyl lithium;

or the chelating ligand is formed by lithium diisopropylamide, an achiral secondary amine, and lithium aminoalcohol, and the chiral lithium aminoalcohol is in-situ generated by amino alcohol and the n-butyl lithium; and wherein the amino alcohol is (1S,2R)-2-amino-1,2-diphenylethanol.

2. The bimetallic cooperative catalysis system for the synthesis of the (1R,2S)-bedaquiline according to claim 1, wherein the achiral secondary amine is selected from dimethylamine, diethylamine, dipropylamine, dibutylamine, pyrrolidine, N-methylpiperazine, morpholine, thiamorpholine, piperazine, cyclohexylamine, cyclobutylamine, cycloheptamine, or cyclooctylamine.

3. The bimetallic cooperative catalysis system for the synthesis of the (1R,2S)-bedaquiline according to claim 1, wherein the another lithium salt is selected from one or more of lithium carbonate, lithium chloride, lithium bromide, lithium iodide, lithium fluoride, lithium acetate, lithium hydroxide, lithium sulfate, lithium diisopropylamide, lithium tetramethylpiperidine, and lithium hexamethyldisilamine.

4. A method for asymmetric synthesis of (1R,2S)-bedaquiline, comprising: adding an organic solution of 6-bromo-3-benzyl-2-methoxyquinoline (I) dropwise to the bimetallic cooperative catalysis system according to claim 1 at a temperature of −78° C. to 0° C., then adding an organic solution of 3-N,N-dimethylamino-1-naphthyl-1-propanone (II) continuously, and subjecting a resulting product to separation and purification to obtain the (1R,2S)-bedaquiline;

wherein the amino alcohol is (1S,2R)-2-amino-1,2-diphenylethanol.

5. The method for the asymmetric synthesis of the (1R,2S)-bedaquiline according to claim 4, wherein the method comprises the following steps:

S1-1, subjecting the another lithium salt, the amino alcohol, the achiral secondary amine, and the n-butyl lithium to a reaction in a presence of a solvent at −80° C. to 0° C. for 10 min-2 h;

or S1-2, subjecting the another lithium salt, the amino alcohol, the achiral secondary amine, and the n-butyl lithium to a reaction in a presence of a solvent at −80° C. to 0° C. for 10 min-2 h, and then adding the lithium diisopropylamide to carry out another reaction continuously at −80° C. to 0° C. for 10 min-2 h; and S2, adding the organic solution of 6-bromo-3-benzyl-2-methoxyquinoline (I) dropwise into a system in step S1-1 or S1-2, performing stirring to carry out a reaction for 10 min-12 h after an addition is completed, lowering the temperature to −59° C. to −78° C., and then adding the organic solution of 3-N,N-dimethylamino-1-naphthyl-1-propanone (II) to carry out another reaction for 10 min-12 h.

6. The method for the asymmetric synthesis of the (1R,2S)-bedaquiline according to claim 5, wherein in step S1-1, a use amount of the another lithium salt, the amino alcohol, the achiral secondary amine, and the n-butyl lithium is 0.1-5 times, 1-5 times, 0.1-5 times, and 1-5 times of an equivalent of the 6-bromo-3-benzyl-2-methoxyquinoline (I), respectively.

7. The method for the asymmetric synthesis of the (1R,2S)-bedaquiline according to claim 5, wherein in step S1-2, a use amount of the another lithium salt, the amino alcohol, the achiral secondary amine, the n-butyl lithium, and the lithium diisopropylamide is 0.1-5 times, 1-5 times, 0.1-5 times, 1-5 times, and 1-5 times of an equivalent of the 6-bromo-3-benzyl-2-methoxyquinoline (I), respectively.

8. The method for the asymmetric synthesis of the (1R,2S)-bedaquiline according to claim 5, wherein in step S2, an equivalent ratio of the 6-bromo-3-benzyl-2-methoxyquino-line to the 3-N,N-dimethylamino-1-naphthyl-1-propanone is 1:(1-10).

9. The method for the asymmetric synthesis of the (1R, 2S)-bedaquiline according to claim 5, wherein in step S1-1 or S1-2, the solvent is selected from one or more of ethyl ether, tetrahydrofuran, methyl tert-butyl ether, 1,4-dioxane, diisopropyl ether, and ethylene glycol dimethyl ether; and in step S2, an organic solvent used in the organic solution is tetrahydrofuran.

10. The method for the asymmetric synthesis of the (1R,2S)-bedaquiline according to claim 4, wherein the achiral secondary amine is selected from dimethylamine, diethylamine, dipropylamine, dibutylamine, pyrrolidine, N-methylpiperazine, morpholine, thiamorpholine, piperazine, cyclohexylamine, cyclobutylamine, cycloheptamine, or cyclooctylamine.

11. The method for the asymmetric synthesis of the (1R,2S)-bedaquiline according to claim 4, wherein the another lithium salt is selected from one or more of lithium carbonate, lithium chloride, lithium bromide, lithium iodide, lithium fluoride, lithium acetate, lithium hydroxide, lithium sulfate, lithium diisopropylamide, lithium tetramethylpiperidine, and lithium hexamethyldisilamine.

* * * * *